United States Patent [19]
Hickerson

[11] 3,782,033
[45] Jan. 1, 1974

[54] POT FILLING AND COMPACTING APPARATUS AND METHOD

[76] Inventor: Norman E. Hickerson, P.O. Box 1148, Apopka, Fla. 32703

[22] Filed: Sept. 30, 1971

[21] Appl. No.: 185,037

[52] U.S. Cl. .................................. 47/1, 222/56
[51] Int. Cl. ........................................ A01c 9/08
[58] Field of Search ............... 47/1, 37; 141/71, 141/73, 79, 86, 105, 131, 134; 222/56

[56] References Cited
UNITED STATES PATENTS

| | | | |
|---|---|---|---|
| 2,771,709 | 11/1956 | Ritter | 47/1 |
| 2,869,283 | 1/1959 | Krause | 47/1 |
| 3,587,675 | 6/1971 | DiTucci | 141/131 |
| 3,587,674 | 6/1971 | Adkin | 141/134 |
| 2,568,332 | 9/1951 | Genouese | 222/56 |
| 3,198,386 | 8/1965 | Hartley | 222/56 |
| 2,349,080 | 5/1944 | Deck | 141/71 |
| 1,260,636 | 3/1918 | Campbell et al. | 141/86 |
| 3,147,780 | 9/1964 | Garriott et al. | 141/131 |
| 2,579,527 | 12/1951 | Wegerhaeuser | 141/86 |
| 3,517,708 | 6/1970 | Eisenberg | 141/131 |
| 2,376,304 | 5/1945 | Anderson | 222/56 |
| 2,623,675 | 12/1952 | Baker et al. | 141/131 |
| 2,637,434 | 5/1953 | Harper | 222/56 |
| 2,721,684 | 10/1955 | Heinl et al. | 141/86 |
| 2,826,003 | 3/1958 | Oki et al. | 47/1 |
| 3,571,971 | 3/1971 | Broersma | 47/1 |
| 3,640,020 | 2/1972 | Laible | 47/1 |
| 3,657,839 | 4/1972 | Krause | 47/1 |

FOREIGN PATENTS OR APPLICATIONS

| | | | |
|---|---|---|---|
| 1,570,645 | 6/1969 | France | 47/1 |

*Primary Examiner*—Stephen C. Pellegrino
*Attorney*—Duckworth & Hobby

[57] ABSTRACT

An apparatus and method for filling pots with soil and compacting the soil in the pots. Spilled soil is collected and returned to a hopper for re-use and a punch is provided for driving a hole in the soil in the pot.

10 Claims, 3 Drawing Figures

INVENTOR.
Norman E. Hickerson
BY Duckworth & Hobby
ATTY'S.

INVENTOR.
Norman E. Hickerson
BY Duckworth & Hobby
ATTY'S.

POT FILLING AND COMPACTING APPARATUS AND METHOD

BACKGROUND OF THE INVENTION

The present invention relates to potting machines and especially to an apparatus and method for filling flower pots, or the like, with soil or similar materials in a uniform manner, compacting the soil to a prescribed compactness and punching holes in the soil for planting seeds, plants, or the like.

In the past, the filling of pots with soil or similar material has been most commonly performed by hand, either by an individual filling the pot and compacting it, or filling the pot and planting a cutting therein as the pot is fed along a conveyor belt. Once the pot has been filled with soil, it is packed down to a generally uniform compactness and a hole is pushed into the soil for placing cuttings, seeds or plants which are then cultivated and sold to nurseries and other commercial outlets. To reduce the labor involved in handling large quantities of potting, various systems have been proposed for feeding the pots on conveyors, filling the pots and automatically planting the plants. Typical prior art devices may be seen in U.S. Pat. No. 2,771,709 for Planting Equipment, which feeds square planting boxes along conveyors held in pot carriers, and has a hopper dumping soil in all of the pots as they go past the hopper. The pots then pass a compressing station where the plant pot carrier with a plurality of pots therein is aligned and all of the pots have their soil compacted and a hole driven therein simultaneously with one driver having a plurality of compacting members thereon. The plants then go into a planting station where they are individually planted.

Another such plant potting machine can be seen in Patent No. 2,869,283, in which a rotating potting machine inserts a plant into a pot and fills it with soil simultaneously from the sides as each pot passes by. In U.S. Pat. No. 2,826,003 for a Machine for Depositing and Shaping Soil in a Transplanting Container, round pots are ejected from a stack onto a conveyor belt, filled with soil and a rotating bit is driven into the soil to form a cavity for planting a cutting or plant in the soil. Other patents illustrating potting machines are U. S. Pat. No. 3,012,370 for an Apparatus for Potting Plant Seeds, Seedlings and the Like, in which a chain conveyor holds pots which are filled from a hopper. U.S. Pat. No. 2,884,022 for a Plant Potting Machine which is driven by a chain conveyor past a hopper for filling each pot; and U.S. Pat. No. 3,337,986, for an Automatic Plant Pot Filling Machine.

In contrast to these prior art patents the present invention provides a simple and rugged apparatus in which a hopper feeds soil onto a conveyor belt, which in turn feeds individual pots being fed on a different conveyor belt, rather than feeding the pots directly from the hopper. The conveyor loading the individual flower pots is then adapted to compact soil in each pot to a uniform compactness. The present apparatus advantageously provides for capturing and feeding spilled soil back into the hopper as well as controlling the level of the soil in the hopper and for driving planting holes in the soil in each pot, as desired.

SUMMARY OF THE INVENTION

The present invention relates to a machine and method for placing and compacting soil in containers and especially to such a machine for use by commercial nurseries, and the like, for preparing pots for the planting of cuttings, seedlings, seeds, and the like. The machine has a frame in which the main conveyor belt has pots placed or ejected thereonto for feeding along the conveyor belt. Guides direct the pots to a predetermined position on the belt and feed them in succession to a soil-filling position. A hopper, which is filled to a predetermined level with soil for filling the pots, feeds the soil onto a second conveyor belt located above the main conveyor belt. The second conveyor belt has generally uniform amounts of soil fed thereto by the level of the soil being maintained in the hopper. The soil is then fed off the second conveyor belt into the pots which then have any excess soil scraped off by a scraper bar. The pots are then fed between the main and the said feeding conveyor belts which belts have the distance there between adjusted for the particular size pots being fed through the machine. The belts are being driven in opposite directions and at the same speed so that the top belt in addition to feeding the soil to the individual pots, compacts the soil in the pots as each pot rides between the belts. The upper, or second conveyor belt, along with the hopper feeding the soil thereto, are adjustable for adjusting the level between the main belt and the upper belt and adjustable guides are provided to direct the pots in position for the main flow of the soil. The level of the soil in the hopper is controlled by a treadle switch which controls a conveyor feeding soil to the hopper, stopping and starting the conveyors to maintain the level of the soil in the hopper. Excess soil is fed from the main conveyor into a catching pan having an auger therein for feeding the soil to a lifting conveyor which lifts it back into the hopper. The pots are guided over a narrow bridge to another conveyor and an electric or hydraulic driven plunger, which is activated by an electric relay, is adapted to plunge a hole of predetermined dimensions into the soil of each pot as it passes there through while at the same time compacting the soil around the hole driven in the soil, rather than just removing soil from the container.

It is accordingly an advantage of the present invention to provide a pot filling machine and method having a unique filling and compacting means as well as an improved hole-driving system for placing a hole in the soil in the containers while automatically re-using spilled soil and controlling the feed of the soil to the hopper which in turn helps control the rate of the soil being fed from the hopper.

BRIEF DESCRIPTION OF THE DRAWINGS

Other objects, features and advantages of this invention will be apparent from a study of the written description and the drawings, in which.

DESCRIPTION OF THE PREFERRED EMBODIMENT

Figure 1:
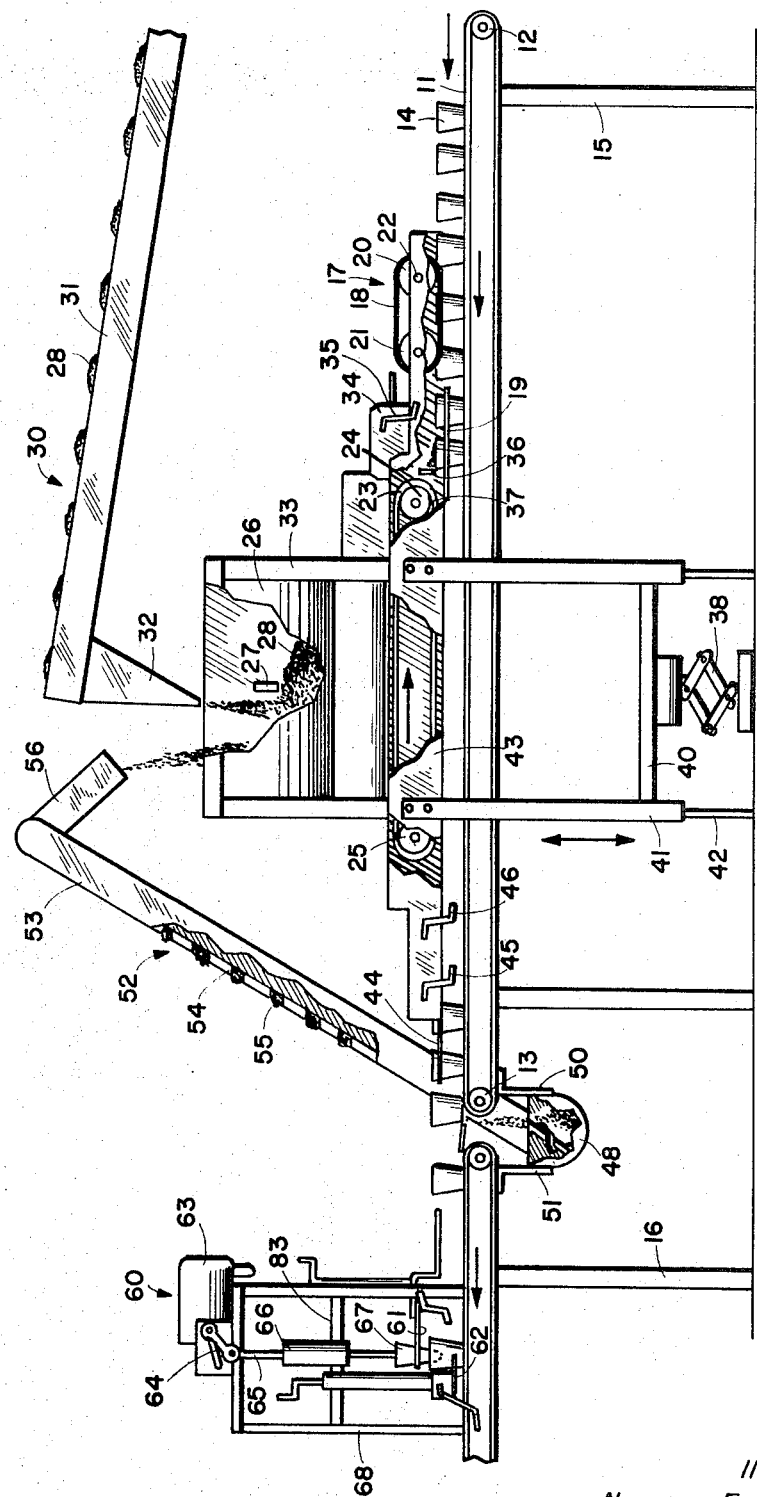
FIG. 1 is a side elevation view with portions cut away of an an apparatus in accordance with the present invention.

Referring now to FIG. 1, a container potting machine 10 is illustrated having a main conveyor belt 11 driven by a pair of shafts 12 and 13 and which may have rotatable shaft supports to support the belt between the shafts 12 and 13 if desired. However, the belt 11 is driven by the rotation of the shafts 12 and 13. A plurality of pots 14 are deposited on the top of the belt 11 and are conveyed along the belt. The entire apparatus is of course supported by a frame, only portions of which is shown, but a pair of legs 15 and 16 are illustrated holding the apparatus off the floor. The pots 14 are fed into a pot feeding mechanism 17 which engages each pot 14 and by means of a rotating belt 18 on a pair of shafts 20 and 21 attached to a frame 22, allowing the pots to be fed out closer together in a uniform manner and located transversely into proper position on the conveyor belt 11. A pair of pot guides 19 may also be used which are transversely adjustable for different alignment of pots being fed along the conveyor belt 11, keeping the pots aligned as they pass into the loading position. A second conveyor 23 may also be of a belt type and is supported and driven by a pair of shafts 24 and 25. The second belt is located above the main conveyor belt 11 and directly beneath a hopper 26 which hopper is maintained with soil for filling the containers 14. The hopper has a predetermined opening space between the hopper 26 and the upper belt 23 so that soil is fed at a uniform rate onto the belt 23 as long as the gravitational force of soil in the hopper 26 remain uniform. Thus the soil level in the hopper 26 must be controlled so that the weight of the soil in the hopper is generally the same at all times. The soil is controlled by a treadle switch 27 which will be described in more detail in connection with FIG. 2, and which measures the level of the soil 28 in the hopper 26 and controls the operation of a soil conveyor 30 having frame members 31 which conveys the soil 28 to a discharge chute 32 into the hopper 26. The switch 27 controls the operation of the conveyor 30 and allows more soil to be fed into the hopper 26 whenever the soil level drops too low and shuts the conveyor 30 off when the soil level reaches a predetermined height in the hopper 26. The soil 28 is fed from the hopper 26 which has frame members 33 supporting the hopper onto the conveyor 23, which soil is guided on the conveyor by the soil guide 34 having a handle 35 for transversely adjusting the soil guide to direct the soil directly over the pots 14 being fed thereunder. This prevents the excess spillage of soil being fed off the conveyor belt 23 and into the pots 14. The soil is fed off the conveyor belt 23 over a scraper bar 36 and fills each pot 14 with an excess level of soil 28. The excess soil is scraped off by the bar 36 which leave a predetermined amount of soil located above each pot 14 as the pot proceeds along the conveyor belt 11. Conveyor belts 23 and 11 operate in opposite directions with conveyor belt 23 going in a clockwise direction, while conveyor belt 11 is going in a counter-clockwise direction, as shown. The belt 23 has also had its height adjusted so that it is approximately equal with the top of each container 14 as the pot 14 passes under the bottom portion 37 of the conveyor belt 23. Belts 23 and 11 move at approximately the same speed so that as each pot 14 passes under the conveyor belt 23 at it moves along the conveyor belt 11 it will have the soil therein compacted by the bottom portion 37 of the conveyor belt 23. Since the soil has already been scraped to a uniform level by the scraper bar 36, each container 14 has the soil compacted to a generally uniform compactness which may be adjusted by raising or lowering the bar 36 to allow different amounts of soil to protrude above the containers 14 when they are filled and also by adjusting the distance between the bottom 37 of the belt 23 and the top of the conveyor belt 11. This is performed by a jack 38, which jacks up a cross-frame member 40 and a plurality of telescoping vertically extending members 41 which telescope over the plurality of bars 42 which may be attached to the floor or to the framework as desired. Operation of the jack 38 will drive vertically extending bars of frame members 41 vertically or up and down as desired, since these are attached to frame members 43 which support the shafts 24 and 25 along with the belt 23 and also support the frame members 33 supporting the hopper 26. This entire unit is lifted up and down by the jack 38. The belt 33 is adjusted for the different size pots 14 and different amounts of compactness desired within each pot which necessitates lifting the entire hopper 26 which in turn lifts the soil guide 34 along with the pot feed 17 and any guides utilized for feeding or guiding the pots 14 as they pass along the conveyor belt 11. As the pots pass under the conveyor belt 11, they are captured by a pair of guide bars 44 which are controlled by a pair of handles 45 and 46 which adjust the distance therebetween for feeding different size pots along conveyor 11. These guides 44 direct the pots across a narrow bridge 47 which allows spilled soil on conveyor belt 11 which is generally to either side of the pots 14 to spill over into a casing 48 having an auger therein. Casing 48 is held by frame members 50 and 51 and catches the soil spilling from the belt 11 and is driven by the auger located in the casing 48 onto the bottom of a lifting conveyor 52 having a frame member 53 along with a conveyor belt 54. Belt 54 has lifting members 55 thereon to help in lifting soil along a rather steep inclined plane. The conveyor 52 picks up the soil onto the conveyor belt 54 and lifts it onto a chute 56 where it is dropped back into the hopper 26 so the spilled soil is continuously being refed back into the hopper 26 without loss or cleanup. As each pot passes over the bridge 47 it is caught by a conveyor belt 57 which moves in the same direction as the conveyor belt 11 but at a faster speed so that the pots 14 passing thereonto are separated by a greater distance on conveyor belt 11. Each pot 14 may have a hole punched in the soil therein which operation may be performed as it passes along the conveyor belt 57 or could of course be performed before it leaves the conveyor belt 11, if desired, without departing from the spirit and scope of the present invention. The hole driving or punching apparatus will be discussed in more detail in connection with FIG. 3, but is illustrated generally in FIG. 1. The hole punching mechanism 60 may be driven by an electrical solenoid or by hydraulic cylinder, but each pot 14 is picked up by a pair of guides 61 for aligning the pot in the proper position and fed to a predetermined position where it hits a switch contact 62 which activates an electric motor, electric solenoid or hydraulic cylinder 63 which drives a lever member 64 through one cycle down and back up again, driving a shaft 65 riding in support bearing 66 for driving the hole punch 67 in the center of a pot which has activated the switch contact 62. Framework 68 holds the apparatus and as will be described in more detail in connection with FIG. 3, a plurality of handles are provided for controlling the various functions of the punch drive for different size pots. However, one advantage of the present hole punch over prior devices is that it drives a hole while compacting the soil, rather than rotating the punch for removing the soil without compacting it allowing the hole to remain in a generally uniform manner without soil spillage or cave-ins while placing cuttings, or the like, in the pots.

Figure 2:
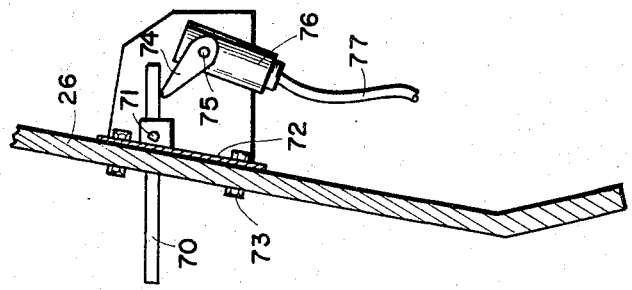
FIG. 2 is a sectional view of a treadle switch for use with the hopper for controlling the soil level, in accordance with the present invention.

FIG. 2 illustrates the treadle switch connected to the hopper 26 and having a treadle switch member 70 pinned by pins 71 which is attached to a bracket 72 which is bolted by bolts 73 to the hopper 26. Treadle member 70 is allowed to rotate on the pin 71 and a lever bar 74 is connected to a shaft 75 on a relay switch 76 and raising or lowering of the treadle switch member 70 will push the lever bar 74 up or down opening the switch in one direction and closing it in the other. An electrical conductor 77 is connected to the motor and operates the conveyor 30 of FIG. 1 to turn the conveyor on and off to maintain the level of the soil within the hopper 26.

Figure 3:
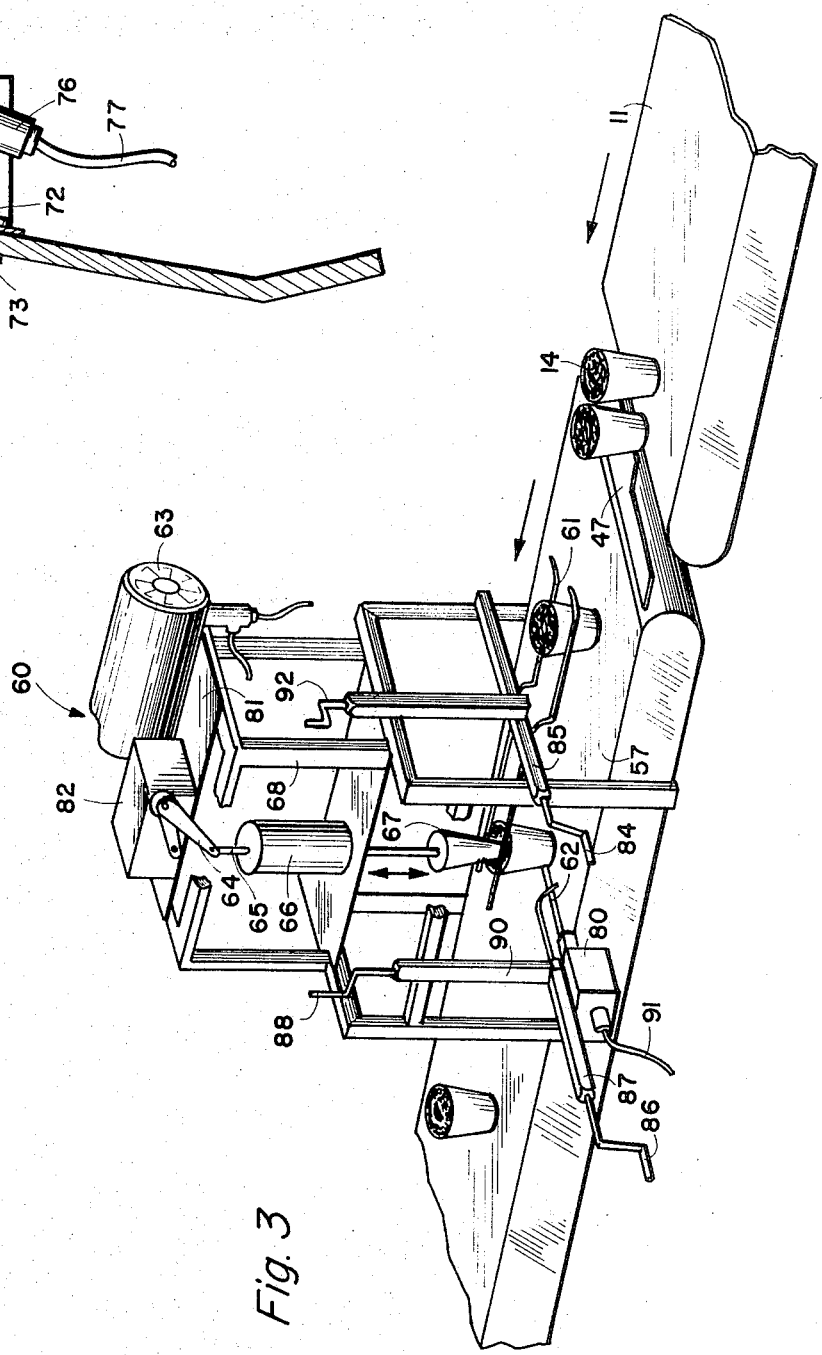
FIG. 3 is a perspective view of the hole punching mechanism for punching holes in the soil in the containers.

FIG. 3 more clearly illustrates the operation of the punch apparatus 60 and shows the conveyor belt 11 feeding the pots 14 across the bridge member 47 onto the conveyor belt 57. Each pot 14 is captured and guided by guides 61 until they hit a switch contact member 62 which activates a relay switch 80 which operates the motor 63 for driving a clutched lever 64 through one rapid cycle. The lever 64 drives the drive shaft 65 in a vertical direction, first down and then releasing for raising the shaft 65 lineal bearing 66. Framework 68 has a top portion 81 for holding the motor 63, clutch 82 and an intermediate level platform 83 for holding the bearings 66. The shaft 65 has the hole-driving or punch member 67 thereon which may be shaped as desired but is illustrated as shaped in a generally truncated cone shape for driving a cone-shaped hole in the soil located in each pot 14. This direct drive, without any twisting motion, not only drives the hole into the soil but also compacts the soil in a preferred manner in each container. Guides 61 may be controlled for different size pots by a handle 84 which drives a threaded member located inside the frame member 85, which threaded portion is threaded for each threaded connecting portion holding each side of the guides 61. A handle 86 connected through a frame member 87 and a handle 88 connected to a frame member 90 are adapted to control the location of the relay switch 80 along with its feeler con-tact 62 for controlling the exact position that the pot 14 will activate the feeler contact 62 relay 80 for transmitting a signal through the conductor 91 to operate the motor 63. A handle 92 is adapted to raise the frame member 85 to raise the guides 61 for different height pots being fed through the system. Once the hole is punched in the soil in the pot 14, the pot is fed on along the conveyor 57 where it can be automatically or hand planted with a seedling, cutting or seed or the like.

It should be clear at this point that a potting machine for filling pots or other containers with soil or other materials has been provided, which is especially useful in filling flower pots with soil and for compacting and placing holes in the soil in the pots. It will of course be clear to those skilled in the art that other types of containers can be filled with other types of materials, without departing from the spirit and scope of the invention, and other features can be added to the invention without departing from the scope. For instance, pots 14 can be fed to the conveyor 11 by an automatic ejector system for ejecting the pots when the machine is actuated, and an automatic seed or seedling feeding mechanism can be provided at the opposite end of conveyor 57. It should also be clear that the essential features of the present invention have been described in detail, but it will be clear that any drive system desired can be utilized for driving the conveyor belts even though it is anticipated that an electrical motor or motors will drive the conveyor belts through chain drives, or the like. Different speeds can be obtained by using different motors or by using a chain and sprocket for varying the speed of a particular belt.

Accordingly the present invention is not to be construed as limited to the particular forms disclosed herein since these are to be regarded as illustrative rather than restrictive.

I claim:

1. A machine for filling containers with soil and compacting the soil placed in the containers, comprising in combination:
   a. a frame;
   b. a first endless belt conveyor connected to said frame movable in the first direction for conveying containers thereon;
   c. a second endless belt conveyor connected to said frame and located above said first endless belt conveyor and movable in a direction opposite to said first endless belt conveyor at substantially the same speed as said first endless belt conveyor for conveying soil for filling said containers on said first endless belt conveyor as they pass thereunder, said second endless belt compacting the soil in said containers as said containers pass thereunder;
   d. a hopper attached to said frame and located over said second endless belt for feeding soil therein onto said second endless belt;
   e. guide means attached to said frame and located above said conveyor for guiding containers thereon;
   f. a scraping bar connected to said frame and located adjacent said second endless belt for leveling soil in said containers to a predetermined level above said containers; and
   g. adjustment means for adjusting the distance between said first and second endless belt conveyors for separating said belts by a predetermined distance in accordance with the height of containers to be fed by said first endless belt conveyor whereby soil fed into containers by said second endless belt conveyor may be compacted when said containers pass between said first and second endless belt conveyors.

2. The apparatus in accordance with claim 1 in which said guide means are adjustable bar guides connected to said frame for directing said containers to pass between said first and second endless belt conveyors.

3. The apparatus in accordance with claim 1 in which said hopper includes control means for controlling the level of soil therein.

4. The apparatus in accordance with claim 3 in which a third conveyor conveys soil into said hopper means and said control turns said third conveyor means on and off to maintain predetermined levels of soil in the hopper.

5. The apparatus in accordance with claim 1 in which said containers pass over a bridge connected to said frame when said containers pass from said first endless belt conveyor so that excess soil that has spilled on said first endless belt conveyor is allowed to fall to either side of said bridge into a collection container.

6. The apparatus in accordance with claim 5 in which said collection container directs said spilled soil from said first endless belt conveyor into a fourth conveyor operatively connected to said hopper for conveying said spilled soil back into said hopper.

7. The apparatus in accordance with claim 6 in which said bridge means allows said containers to be received by a fifth conveyor, said fifth conveyor travelling at a higher speed than said first endless belt conveyor in order to separate said containers passing onto said fifth conveyor.

8. The apparatus in accordance with claim 1 including means for driving holes in said soil located in said containers, said means being attached to same frame.

9. The apparatus in accordance with claim 1 in which said second endless belt conveyor and said hopper are movable together to adjust the distance between said first and second endless belt conveyor.

10. A method of filling and compacting soil in containers comprising the steps of:
 a. feeding containers on a first endless conveyor belt moving in a first direction;
 b. feeding soil from a second endless conveyor belt, located over said first endless conveyor belt and moving in a second direction substantially opposite to said direction of said first endless conveyor belt, into said containers on said first endless conveyor belt as said containers move under said second endless belt conveyor;
 c. compacting said soil in said containers with said first endless conveyor belt pressing on said soil as said containers pass thereunder, whereby containers are filled with soil and compacted therein;
 d. leveling the soil in said containers to a predetermined level above said containers prior to compacting said soil; and
 e. adjusting the distance between said first and second endless conveyor belts prior to feeding said containers on said first endless conveyor belt.

* * * * *